A. J. SWING.
SPRING WHEEL.
APPLICATION FILED OCT. 3, 1910.

1,003,668.

Patented Sept. 19, 1911.

Inventor
Alfred J. Swing

Witnesses

Attorneys

UNITED STATES PATENT OFFICE.

ALFRED J. SWING, OF CINCINNATI, OHIO, ASSIGNOR TO THE AUTO-SPRING WHEEL COMPANY, OF CINCINNATI, OHIO, A CORPORATION OF OHIO.

SPRING-WHEEL.

1,003,668.  Specification of Letters Patent.  Patented Sept. 19, 1911.

Application filed October 3, 1910. Serial No. 585,124.

*To all whom it may concern:*

Be it known that I, ALFRED J. SWING, a citizen of the United States, residing at Cincinnati, in the county of Hamilton and State of Ohio, have invented certain new and useful Improvements in Spring-Wheels, of which the following is a specification.

My invention relates to an improvement in spring wheels, wherein the yielding connections between the hub portion and rim portion are connected to each other, parallel with the axis of the wheel, so as to serve for both vertically yielding and lateral strains brought between the members.

The object of my invention is to provide a spring wheel, with a bifurcated hub extension, with the rim interposed between the same, and tension means connecting with the rim and hub extensions upon each side thereof.

The features of my invention are more fully set forth in the description of the accompanying drawings, forming a part of this specification, in which:—

Figure 1:
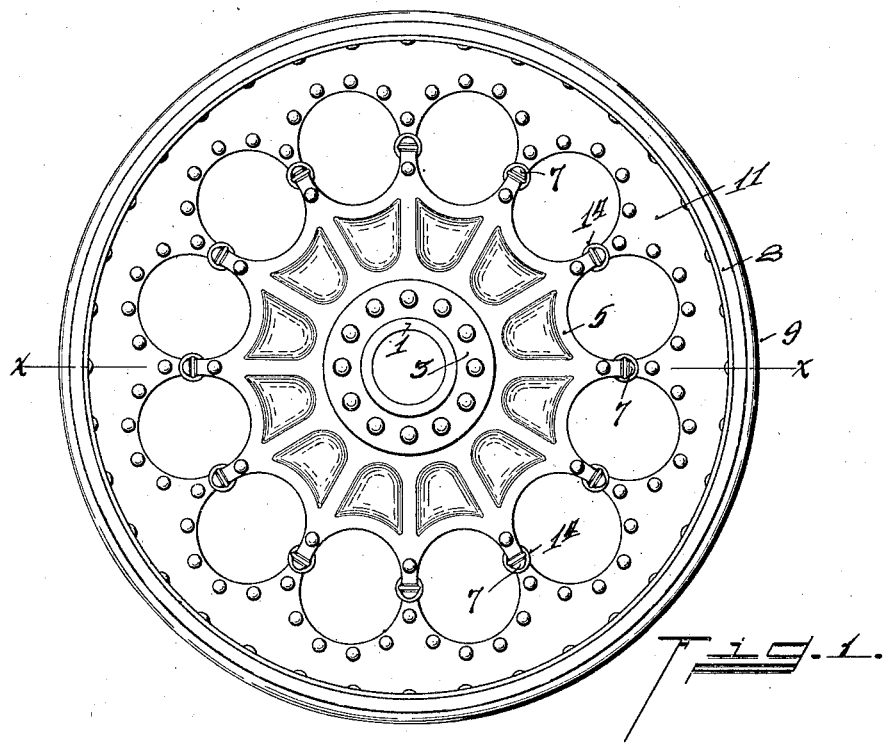
Figure 2:
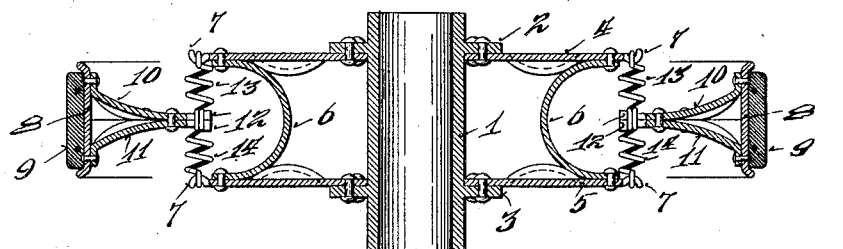

Figure 1 is a side elevation of my improved spring wheel. Fig. 2 is a section on line *x,—x*, Fig. 1.

As illustrated in the drawings, the wheel is preferably formed of sheet metal plates, stamped and bent in the proper shape and riveted or otherwise secured together.

1 represents the hub, provided with the annular flanges 2, 3, to which are secured the web-plates 4, 5, forming a bifurcated extension of the hub.

6 represents reinforcing plates interposed between the web plates 4, 5, to relieve the web plates of inward or bending strain.

The peripheries of the web are preferably of scalloped-formation, to provide the hooked bends 7.

8 represents the rim, its periphery preferably of channel formation, to receive the elastic tread band 9. The rim on its inner periphery is provided with the web-plates 10, 11, joined together in a vertical medial line of the rim forming a reinforced web, with its inner periphery preferably also of scalloped-formation, to provide means, in the form of hook bends 12, alined with the hooked bends 7, to receive the coil springs 13, 14, upon each side of the rim web.

Thus, the lateral and vertical strains are taken care of by duplicate springs, disposed parallel to the axis of the hub, and with the action of each spring, upon each side of the rim web, independent of each other. This prolongs the life of the spring, makes the wheel more resilient, with the springs accommodating themselves to and taking care of all the strains in any direction or angle incident to its use.

While in the general construction of the wheel, stamped sheet metal is employed, it is obvious, that the same may be otherwise built, without departing from the features of my invention.

Having described my invention, I claim:—

1. A wheel, comprising a first member surrounding the wheel axis at right angles to said axis and provided with a circumferential series of radial arms, a second member similarly surrounding the wheel axis and formed with two parts, each of the parts being provided with radial arms in alinement with the radial arms of the first member, one at each side of said first member, one of said members being secured to the hub of the wheel and the other to the rim of the wheel, and a circumferential series of spring devices extending across between the two parts of said second member and having their ends attached to the radial arms of the two parts of the second member and having their central portions permanently attached to the radial arms of said first member, combined substantially as set forth.

2. A wheel, comprising a hub, a pair of separated disks rigidly secured thereto and lying in planes at right angles to the axis of the hub, outwardly concave bows disposed between the disks and having their outer ends rigidly secured to the outer portions of the disks, a circumferential series of tension springs having their ends secured to the outer portions of said disks at the outer ends of said bows, a rim, an annular inward extension from the rim to a point midway between the two disks, and means for securing said annular member to the intermediate portion of each of said springs, combined substantially as set forth.

In testimony whereof, I have hereunto set my hand.

ALFRED J. SWING.

Witnesses:
EMMA SPEUER,
LOUISE BECK.

Copies of this patent may be obtained for five cents each, by addressing the "Commissioner of Patents, Washington, D. C."